Patented Oct. 11, 1932

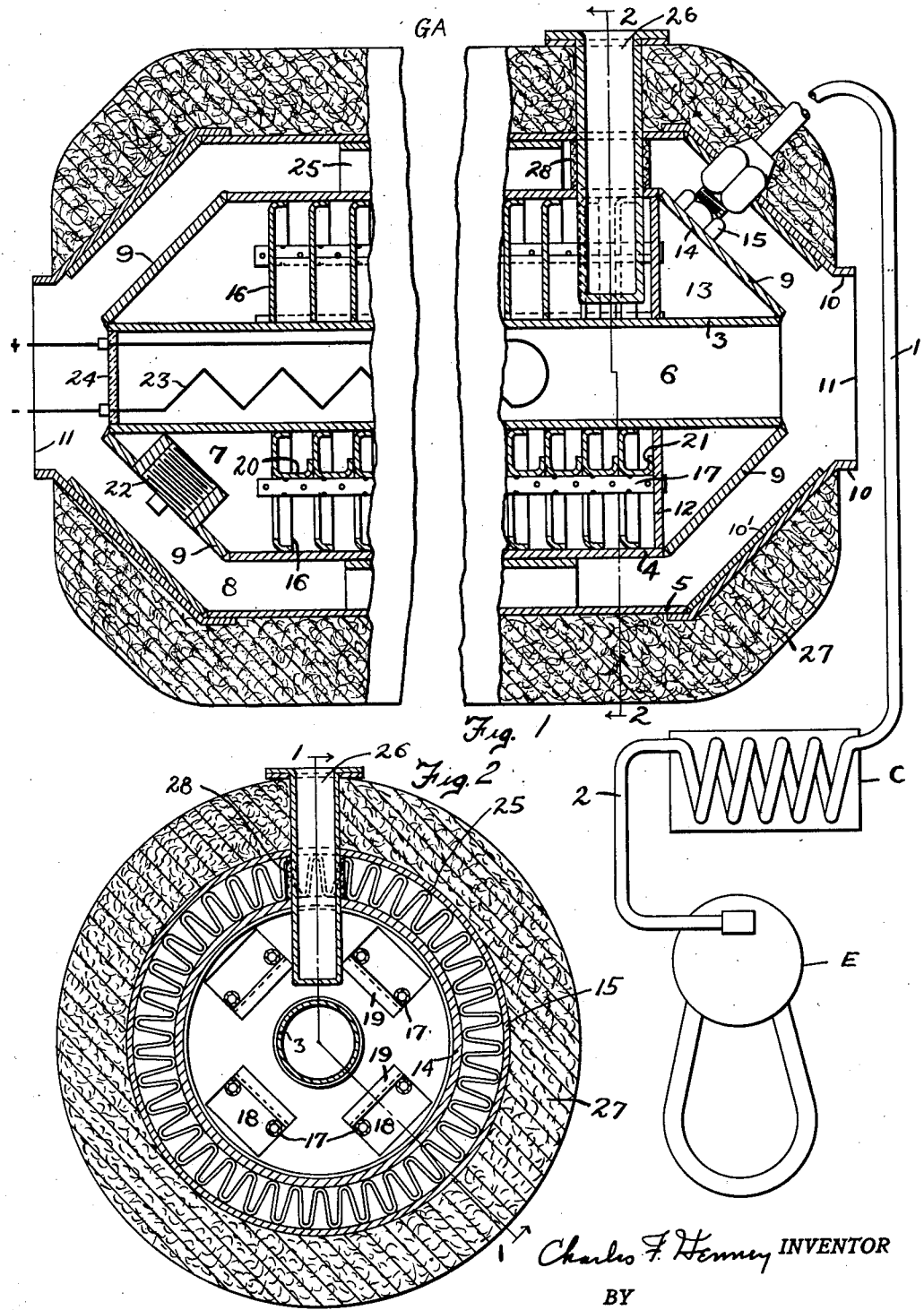

1,881,568

UNITED STATES PATENT OFFICE

CHARLES F. HENNEY, OF DAYTON, OHIO, ASSIGNOR TO FRIGIDAIRE CORPORATION, OF DAYTON, OHIO, A CORPORATION OF DELAWARE

REFRIGERATING APPARATUS

Application filed January 31, 1930. Serial No. 424,933.

This invention relates to refrigerating apparatus of the absorption type. In this type of apparatus it is customary to use a generator-absorber containing a material either solid or liquid capable of absorbing, adsorbing and liberating large quantities of a refrigerant gas under different degrees of temperature. During one period of operation, known as the distillation or generating period, heat is applied to the generator-absorber to drive off the refrigerant which passes to and is condensed in a condenser and finally is collected in liquid form in an evaporator. Subsequently when sufficient refrigerant has been liberated by the absorption material the heat is cut off and the generator-absorber cooled, causing the evaporation of liquid refrigerant in the evaporator and an absorption of the gas in the absorbent material within the generator-absorber. This latter period is known as the absorbing period.

It is to the construction of this generator-absorber that my invention is directed.

One of the objects of this invention is to provide an improved generator-absorber, one that is strong, durable, relatively simple and cheap to manufacture and assemble and capable of efficiently operating with a solid absorbent.

Another object is to provide an improved generator-absorber capable of operating with a solid absorbent and capable of being adequately cooled by air.

Further objects and advantages of the present invention will be apparent from the following description, reference being had to the accompanying drawing, wherein a preferred form of the present invention is clearly shown.

In the drawing:

Fig. 1 is a diagrammatic showing of a refrigerating system with the generator-absorber shown in section on the line 1—1 of Fig. 2; and Fig. 2 is a section on the line 2—2 of Fig. 1.

Referring to the drawing wherein like numerals indicate like parts, I have shown a refrigerating system composed of a generator-absorber GA, a condenser C and an evaporator E connected by the conduits 1 and 2 to form a closed system. The generator-absorber comprises three concentric metal tubes 3, 4 and 5 forming inner, intermediate and outer spaces 6, 7 and 8 respectively. The space between the two inner tubes or in other words the space 7 is closed at its ends by the cone shaped members 9 to form an absorption chamber for absorption material such as calcium chloride or any other solid material having similar properties. The outer tube is also provided at its ends with cone-like members 10 overlapping the cone shaped ends 10' of the tube 5 and provided with openings 11 aligned with the inner space 6 and forming therewith a plurality of concentric flues for a purpose hereinafter described.

The intermediate space 7 or the absorbing chamber is provided with an annular plate 12 securely attached to the inner and intermediate tubes 5 and 4 to form a header chamber 13, the header chamber being provided with an outlet 14 communicating with conduit 1 secured to the generator absorber by the fitting 15. Also within the chamber 7 is provided a plurality of discs 16 spaced apart as shown and provided with turned up peripheral portions for attaching the discs to the inner and intermediate tubes in any known manner. Secured to the plate 12 and passing through the discs 16 is a plurality of perforated bleeder tubes 17 communicating with the header chamber 13 at one end and extending substantially throughout the entire length of chamber 7.

Referring to Fig. 2 it will be seen that the discs 16 are provided with a plurality of aligned openings 18 through which pass the bleeder tubes 17. The bleeder tubes may be copper tubes and as shown, each set of aligned openings may receive two of the tubes. These openings are formed by punching out a three sided section 19, bending the section upwardly to form a spacer and a lateral support 20 for the bleeder tubes and finally bending rearwardly as at 21. This provides a convenient method of assembling in that the punched out sections may be utilized as spacers for the next disc and as supports for the bleeder tubes in addition to providing for easy assembling of the bleeder tubes.

At its end opposite the header chamber, the absorbent chamber is provided with an opening closed by the removable plug 22 providing means whereby the solid absorbent material may be introduced into the said chamber.

The inner space or flue 6 is provided with a heating element 23 shown in the form of a resistance coil mounted therein on an insulating cross bar 24 while in the outer space is provided a fin structure 25 shown in the form of a corrugated member extending longitudinally of the said chamber. This fin structure may be of metal and may be brazed to the outer and intermediate shells to form a support for the latter shell. There is also provided a pocket 26 extending within the absorbent chamber for reeciving a thermostat (not shown) whereby the apparatus may be automatically controlled in response to the temperature of the generator-absorber. This pocket 26 is shown as insulated from the flue 8 by means of insulating material 28. The entire generator-absorber is adequately insulated in the usual manner as shown at 27.

In operation, the system operates in the usual manner. During the heating cycle, heat is applied to the inner flue 6 through the medium of the resistance coil 23 causing refrigerant gas to be liberated by the absorption material within space 7. The liberated refrigerant gas, passing through the bleeder tubes 17, header 13, conduit 1, is condensed in the condenser C and collected in liquid form in the evaporator E. When sufficient liquid refrigerant has been collected in the evaporator or when the absorption material has reached the predetermined point of desaturation, the heat is cut off and the generator-absorber is cooled by means of air currents passing through the flues 6 and 8, which cooling air currents may be induced by a fan or blower of some type. This cooling of the generator-absorber results in an evaporation of the refrigerant within the evaporator and the resulting vapors passing through the condenser C, conduit 1, header 13 and the bleeder tube 17 is reabsorbed by the material within the chamber 7.

The construction of the generator-absorber herein disclosed affords adequate radiating surface during the cooling or absorption period. Air will pass through both the inner and outer concentric flues, thereby cooling the absorbent material from both sides. Also during the heating or distillation cycle, the outer flue affords an air space, thereby aiding in preventing the dissipation of heat from the absorbent chamber to the atmosphere.

While I have shown a specific construction of generator-absorber, obviously the concentric flue arrangement may be used with other internal structures of the generator-absorber, for instance with a different arrangement of supporting means for the absorbent material. Also the specific construction of the absorbent chamber may be used without the outer flue, if so desired.

While the form of embodiment of the invention as herein disclosed constitutes a preferred form, it is to be understood that other forms might be adopted, all coming within the scope of the claims which follow.

What is claimed is as follows.

1. In refrigerating apparatus a generator-absorber comprising a container, a plurality of spaced apart discs within said container, each of the discs having a portion cut out of the body of the disc to form openings, said portion being bent to form a spacer section for the next succeeding disc, a plurality of bleeder tubes passing through said openings, a header at one end of said container communicating with all of said bleeder tubes, and a connection to said header adapted to be connected to a condenser.

2. In refrigerating apparatus a generator-absorber comprising three concentric tubes forming inner, intermediate and outer spaces, the intermediate space being sealed to provide a chamber for absorbent material, the inner and outer spaces communicating at their ends to form parallel concentric flues, a plate within and spaced from one end of said chamber to form a header, a plurality of spaced apart discs within said chamber, the discs being provided with aligned openings, a plurality of perforated bleeder tubes secured to said plate and passing through said openings and extending substantially throughout the length of said chamber, a connection for refrigerant gas leading to said header, means for supplying heat to said inner space and means for circulating air through said parallel flues to cool said generator-absorber.

3. An air-cooled generator-absorber, comprising three concentric tubes, the space between the two inner tubes being sealed to provide an absorbent chamber, the remaining spaces communicating at their ends to form parallel concentric flues, a plurality of sheet metal discs within said absorbent chamber, each disc having a portion cut out of the body of the disc to form an opening, and bent to form a spacer for the next succeeding disc, a plate within said absorbent chamber forming a header chamber, a plurality of bleeder tubes communicating with said header and passing through the openings in said discs, means for circulating air through said communicating flues and means for heating the absorbent chamber, substantially as described.

In testimony whereof I hereto affix my signature.

CHARLES F. HENNEY.